United States Patent

Obara et al.

[11] Patent Number: 5,826,989
[45] Date of Patent: Oct. 27, 1998

[54] COMPOUND BALL BEARING

[75] Inventors: Rikuro Obara; Katashi Tatsuno, both of Nagano-ken, Japan

[73] Assignee: Minebea Kabushiki-Kaisha, Nagano-ken, Japan

[21] Appl. No.: 659,478

[22] Filed: Jun. 6, 1996

Related U.S. Application Data

[62] Division of Ser. No. 131,400, Oct. 5, 1993, Pat. No. 5,560,717.

[30] Foreign Application Priority Data

Oct. 7, 1992 [JP] Japan .................................. 4-293858
Nov. 9, 1992 [JP] Japan .................................. 4-323646

[51] Int. Cl.$^6$ .................................................. F16C 19/10
[52] U.S. Cl. ................................... 384/613; 384/512
[58] Field of Search ............................ 384/613, 614, 384/512, 908, 909, 544

[56] References Cited

U.S. PATENT DOCUMENTS 4,408,808 10/1983 Redmann, Jr. et al. .
4,713,704 12/1987 Voll et al. .
5,013,947 5/1991 Ide .
5,045,738 9/1991 Hishida et al. .
5,048,982 9/1991 Nakanishi .............................. 384/613
5,141,088 8/1992 Kurihara et al. .
5,209,701 5/1993 Ishikawa et al. ...................... 384/544

OTHER PUBLICATIONS

Japanese Abstract No. 58–160322, vol. 9, No. 182 (p. 376) (1905), Jul. 27, 1985.
Japanese Abstract No. 63255869, vol. 13, No. 70 (p. 829), Feb. 2, 1989.
Japanese Abstract No. 61–224836, Oct. 6, 1986, Kazuaki Nakamaori.

*Primary Examiner*—Lenard A. Footland
*Attorney, Agent, or Firm*—Lowe Hauptman Gopstein & Berner

[57] ABSTRACT

A compound ball bearing comprises a bearing body including a spindle 1, a sleeve 2 surrounding the spindle 1, and an inner ring fitted on the spindle or an outer ring fitted in the sleeve, and balls 5, 9 provided between the spindle 1 and sleeve 2, between the spindle and outer ring or between the inner ring 6 and sleeve 2. A motor component such as a hub 11 for the rotor, a flange for the motor base or a yoke yolder is molded as a one-piece molding with the sleeve, spindle or inner ring. The inner or outer ring can be secured in a proper position by facilitating its pre-loading, and the vibration accuracy of the spindle can be improved.

3 Claims, 4 Drawing Sheets

COMPOUND BALL BEARING

This application is a division of application Ser. No. 08/131,400 filed Oct. 5, 1993 now U.S. Pat. No. 5,560,717.

BACKGROUND OF THE INVENTION

1. Field of the Invention

This invention relates to ball bearings mainly used for OA apparatus motors and components thereof.

2. Description of the Prior Art

A usual spindle motor used for OA apparatuses, as shown in FIG. 10, comprises a spindle, a hub as a rotor and a flange as a base, and the spindle is supported in a ball bearing which comprises an inner and an outer ring provided in a sleeve. These components are individually formed as separate members.

Since the prior art motor components are thus independent parts, the motor has a large number of components. Besides, it is necessary to assemble together these components, leading to a large number of steps involded in the motor manufacture and thus to a high cost of manufacture.

Further, in the prior art ball bearing structure, it is not easy to obtain the vibration accuracy of the spindle, and it is difficult to expect substantial improvement of the vibration accuracy.

Further, it has been not easy to obtain the vibration accuracy of the spindle for a pivot or a pulley as rotational component of OA apparatus.

SUMMARY OF THE INVENTION

An object of the invention is to reduce the number of components and number of steps of assembling, thus permitting reduction of the cost of manufacture.

Another object of the invention is to provide a compound ball bearing, in which the inner or outer ring can be secured in a proper position by facilitating the pre-loading, thus obtaining improved spindle vibration accuracy.

In the compound ball bearing according to the invention, a motor component such as a hub for the rotor, a flange for the base or a yoke holder is formed as a one-piece structure integral with the sleeve, the spindle or the inner ring as a component of the bearing assembly. More specifically, according to the invention there is provided a compound ball bearing, which comprises a bearing assembly including a spindle, a sleeve surrounding the spindle and an inner ring fitted on the spindle or an outer ring fitted in the sleeve, and balls provided between the spindle and outer ring or between the inner ring and sleeve, and in which a motor component such as a hub for the rotor, a flange for the base or a yoke holder is formed as a one-piece unitary structure, such as a machining or molding, with the sleeve, spindle or inner ring.

According to the invention, there is also provided a compound ball bearing, which comprises a bearing assembly including a stepped spindle having a large and a small diameter portion, a sleeve surrounding the spindle, and an inner ring fitted on the small diameter portion of the spindle, the large diameter portion of the spindle having an outer race, balls being provided in a row between the outer race and an inner race formed in the sleeve, further balls being provided in another row between an outer race formed in the inner ring and a corresponding inner race formed in the sleeve, and in which a flange for a pivot is formed as a one-piece unit with the sleeve.

According to the invention, there is further provided a compound ball bearing, which comprises a bearing assembly including a stepped spindle having a large and a small diameter portion, a sleeve surrounding the spindle, and an inner ring fitted on the small diameter portion of the spindle, the large diameter portion of the spindle having an outer race, balls being provided in a row between the outer race and an inner race formed in the sleeve, further balls being provided in another row between an outer race formed in the inner ring and a corresponding inner race formed in the sleeve, and in which the sleeve is formed as a one-piece unit with integral opposite end outer flanges and serves as a pulley.

DESCRIPTION OF THE PREFERRED EMBODIMENTS

Now, the invention will be described in conjunction with embodiments thereof illustrated in the accompanying drawings.

Figure 1:
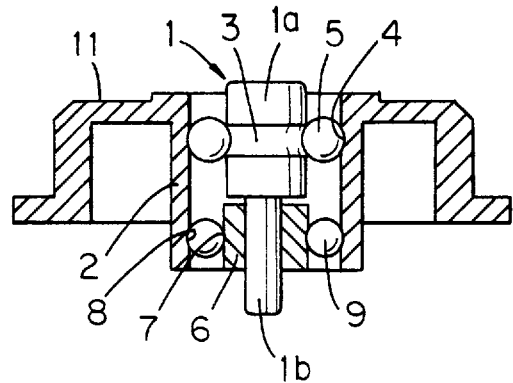
FIG. 1 is a sectional view showing a first embodiment of the invention.

FIG. 1 shows a first embodiment of the compound ball bearing according to the invention. Referring to the Figure, there is shown a double-row ball bearing, in which a spindle 1 and a sleeve 2 corresponding thereto as an outer ring form a bearing assembly for retaining bearing balls provided in two rows.

The spindle 1 is stepped and has a large and a small diameter portion 1a and 1b. The large diameter portion 1a has an outer race 3 for one ball row, while the sleeve 2 has an inner race 4 corresponding to the outer race 3 of the spindle. Balls 5 in one row are provided between the two races 3 and 4.

On the small diameter portion of the spindle, an inner ring 6 is fitted, and balls 9 in the other row are provided between an outer race 7 formed in the inner ring and a corresponding inner race 8 formed in the sleeve.

In the embodiment of FIG. 1, a hub 11 which serves as a rotor of a motor is provided by a process such as machining or molding such that it is integral with the outer periphery of one end of the sleeve 2.

Figure 2:
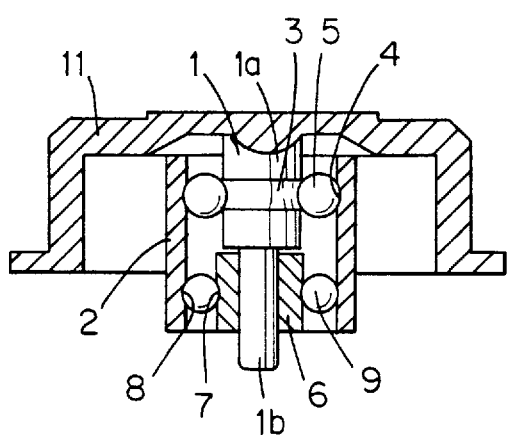
FIG. 2 is a sectional view showing a second embodiment of the invention.

FIG. 2 shows another embodiment, in which a hub 11 is integral with a large diameter portion of a sleeve.

In the embodiments of FIGS. 1 and 2, the inner ring 6 is fitted loosely on the spindle and set in a proper position with a pre-load applied from its lower end face in the Figure. Then it is secured to the spindle by using an adhesive.

Figure 3:
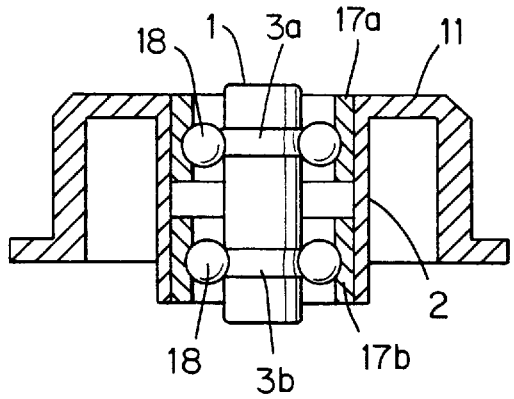
FIG. 3 is a sectional view showing a third embodiment of the invention.

FIG. 3 shows a further embodiment, in which a hub 11 is formed as a one-piece machine or molding with a sleeve 2. In this embodiment, double-row outer rings 17a and 17b are provided, and balls 18 are provided between an inner race in each of the outer rings and each of double-row outer races 3a and 3b formed in the spindle.

Figure 4:
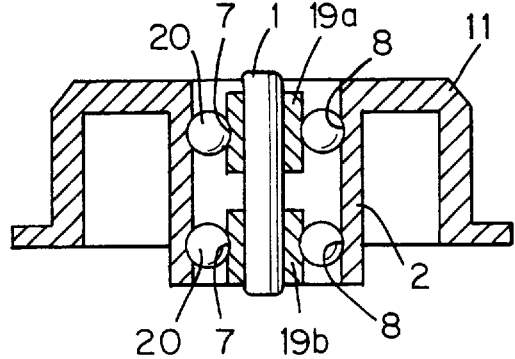
FIG. 4 is a sectional view showing a fourth embodiment of the invention.

FIG. 4 shows a further embodiment, in which a hub 11 is formed as a one-piece unit including with a sleeve 2. In this embodiment, double-row inner rings 19a and 19b are provided on the spindle, and balls 20 are provided between an outer race of each inner ring and each inner face of the sleeve.

In the embodiments of FIGS. 3 and 4, one outer or inner ring 17a or 19a is secured to the sleeve or to the spindle, while the other outer or inner ring 17b or 19b is loosely fitted, set in position by pre-loading and then secured with an adhesive to the spindle or sleeve.

Figure 5:
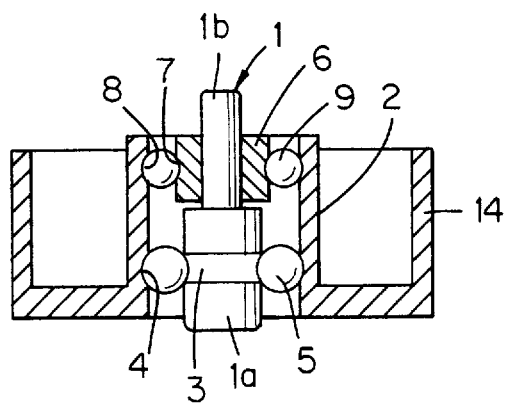
FIG. 5 is a sectional view showing a fifth embodiment of the invention.
Figure 6:
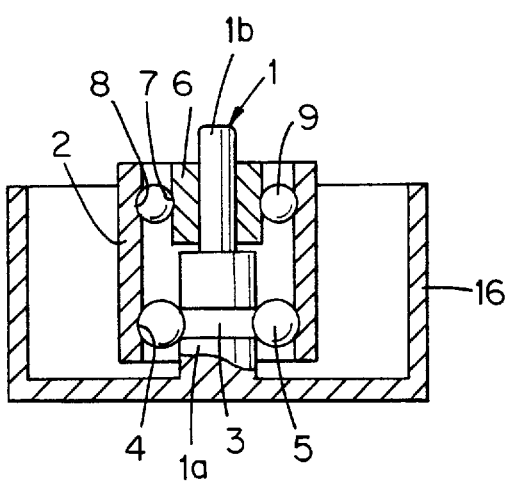
FIG. 6 is a sectional view showing a sixth embodiment of the invention.

FIG. 5 shows a further embodiment, in which a flange 14 which serves as a motor base is formed as a one-piece machine of molding with a sleeve 2. FIG. 6 shows a further embodiment, in which a flange 16 is formed by a process such as molding such that it is integral with a large diameter portion 1a of spindle.

Figure 7:
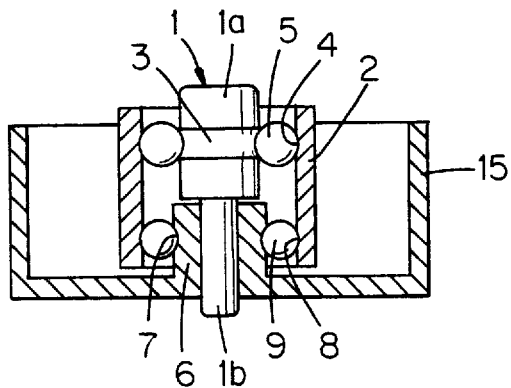
FIG. 7 is a sectional view showing a seventh embodiment of the invention.

FIG. 7 shows a further embodiment in which a flange 15 is formed as a one-piece unit integrated with an inner ring 6.

Figure 8:
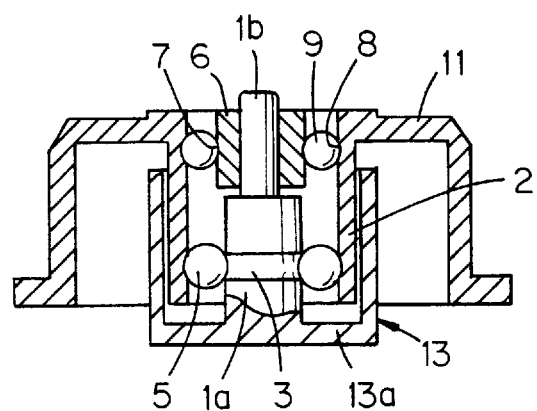
FIG. 8 is a sectional view showing an eighth embodiment of the invention.

FIG. 8 shows a further embodiment, in which a yoke holder 13 with a bottom and surrounding a sleeve is formed such that its inner bottom 13a is integral with a large diameter portion 1a of spindle. In this embodiment, a hub 11 is formed as a one-piece unit having an integral with sleeve.

Figure 9:
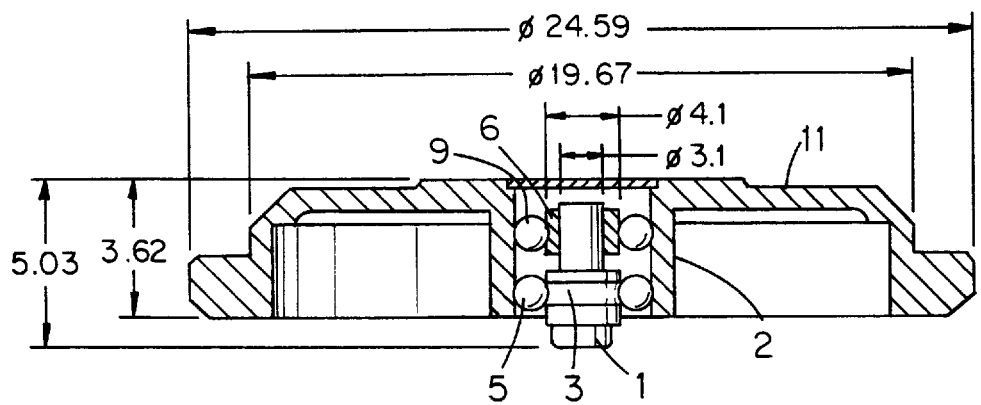
FIG. 9 is a sectional view showing a ninth embodiment of the invention with a showing of dimensions.
Figure 10:
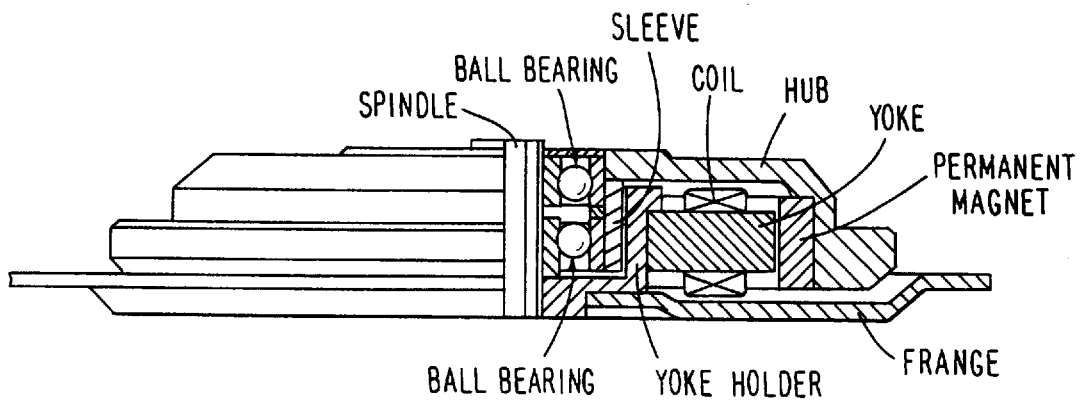
FIG. 10 is a view, partly in section, showing a motor using a prior art drawing.

FIG. 9 shows a further embodiment, in which a hub and a sleeve of bearing assembly are formed together as a one-piece integrated unit. The Figure shows dimensions of various parts in mm.

In the embodiments shown in FIGS. 5 to 9, 11 and 12, the inner ring which has been loosely fitted on the spindle, is pre-loaded and secured with an adhesive to the spindle.

Figure 11:
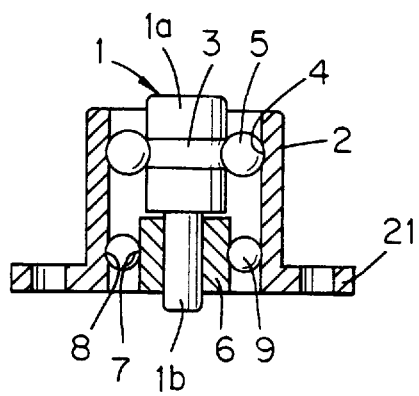
FIG. 11 is a sectional view showing an application of the invention to a pivot.
Figure 12:
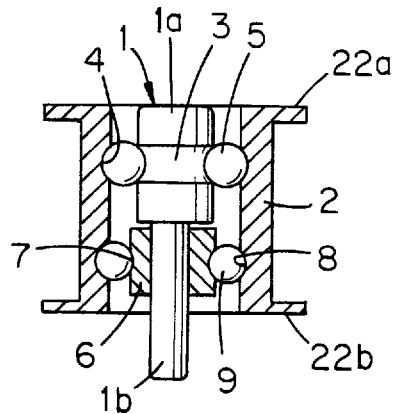
FIG. 12 is a sectional view showing an application of the invention to a pulley.

FIG. 11 shows an application of the invention to a pivot. In this case, a flange 21 and a sleeve 2 are formed together as a one-piece integrated structure FIG. 12 shows an application of the invention to a pulley. In this case, a sleeve 2 is part of a one-piece integrated structure which includes opposite end outer flanges 22a and 22b so that it serves as a rim of the pulley.

Each ball is suitably made of high carbon chromium bearing steel.

According to the invention, a hub as a rotor of a motor, a flange as a base, yoke holder or the like is formed as a one-piece unitary structure with the sleeve or spindle constituting the bearing assembly or with an inner or outer ring thereof. Thus, unlike the prior art bearing structure, in which the hub, the flange, the yoke holder or the like is separate from the bearing assembly, it is possible to readily assemble parts when manufacturing a motor, obtain efficient assembling by using machines and reduce the cost of motor manufacture, these merits being greatly beneficial in industrial production. Further, either of such parts as a hub, a flange and a yoke holder is previously formed as a one-piece molding with the sleeve or spindle constituting the bearing assembly or with an inner or outer ring, the motor manufacture or motor component assembling can be carried out without need of the centering of the spindle with respect to any of the components noted above, and thus it is possible to provide a motor or the like, which is free from shaft vibration and has high accuracy of rotation.

Further, the inner or outer ring can be readily pre-loaded by applying a pressure to it in the axial direction. The inner or outer ring thus can be secured in a proper position to obtain a highly accurate ball bearing.

What is claimed is:

1. A compound ball bearing comprising a bearing body including a spindle and a sleeve surrounding said spindle, and balls provided between double-row inner races formed in double-row outer rings fitted as a pair in said sleeve and corresponding double-row outer races formed in said spindle, wherein a hub for a motor is molded as a one-piece molding with said sleeve.

2. The compound ball bearing of claim 1, said sleeve is integrally formed with said hub as a one-piece by machining.

3. A compound ball bearing comprising:

a bearing assembly including a spindle, a sleeve surrounding said spindle, a first outer ring and a second outer ring fitted in said sleeve, first balls provided between said spindle and said first outer ring, and second balls provided between said spindle and said second outer ring, said spindle having first and second outer raceways in an outer surface thereof, said first and second outer rings having respective inner raceways, said first balls being between said first outer raceway of said spindle and said inner raceway of said first outer ring, and said second balls provided between said second outer raceway of said spindle and said inner raceway of said second outer ring, and said sleeve being integrally formed with a hub as a one-piece unit of a motor.

* * * * *